(12) United States Patent
Tabb

(10) Patent No.: US 12,124,792 B2
(45) Date of Patent: Oct. 22, 2024

(54) WORKFLOW STYLE GOVERNANCE

(71) Applicant: Google LLC, Mountain View, CA (US)

(72) Inventor: Lloyd Tabb, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/301,101

(22) Filed: Apr. 14, 2023

(65) Prior Publication Data

US 2023/0252228 A1 Aug. 10, 2023

Related U.S. Application Data

(63) Continuation of application No. 16/783,166, filed on Feb. 6, 2020, now Pat. No. 11,657,211.

(51) Int. Cl.
| | |
|---|---|
| *G06F 40/166* | (2020.01) |
| *G06F 16/93* | (2019.01) |
| *G06F 21/62* | (2013.01) |
| *G06F 40/197* | (2020.01) |
| *G06Q 10/10* | (2023.01) |

(52) U.S. Cl.
CPC ............ *G06F 40/166* (2020.01); *G06F 16/93* (2019.01); *G06F 21/6218* (2013.01); *G06F 40/197* (2020.01); *G06Q 10/10* (2013.01)

(58) Field of Classification Search
None
See application file for complete search history.

(56) References Cited

U.S. PATENT DOCUMENTS

| | | |
|---|---|---|
| 8,804,177 B2 | 8/2014 | Jahn |
| 2003/0144982 A1 | 7/2003 | Reulein et al. |
| 2011/0246869 A1 | 10/2011 | Vion-Dury |

(Continued)

FOREIGN PATENT DOCUMENTS

| | | |
|---|---|---|
| WO | 2017003971 A1 | 1/2017 |

OTHER PUBLICATIONS

Joeris et al., "Managing evolving workflow specifications," Proceedings. 3rd IFCIS International Conference on Cooperative Information Systems (Cat. No. 98EX122), New York, NY, USA, 1998, pp. 310-319. (Year: 1998).*

(Continued)

*Primary Examiner* — Amelia L Tapp
(74) *Attorney, Agent, or Firm* — Honigman LLP; Brett A. Krueger

(57) ABSTRACT

A method, system and computer program product for workflow style governance includes creating a document and specifying a document style of the document—either a linear workflow style or a branched workflow style. Thereafter, in response to a subsequent request to load the document, the specified document style for the document may be retrieved and, on condition that the specified document style is a linear workflow style, a specified version of the document is retrieved into a document editor for editing as a new version of the document. But otherwise, on condition that the specified document style is a branched workflow style, different components of the document are retrieved as a composition of components, each of an independent version, and a selected one of the components of the composition of the components making up the document is then loaded into a component editor for editing as a new version.

20 Claims, 2 Drawing Sheets

(56) References Cited

U.S. PATENT DOCUMENTS

| | | |
|---|---|---|
| 2014/0101182 A1 | 4/2014 | Roy et al. |
| 2015/0248484 A1* | 9/2015 | Yu .................. G06F 16/9535 707/711 |
| 2016/0246899 A1 | 8/2016 | Hirschtick et al. |
| 2016/0378735 A1 | 12/2016 | Mullins et al. |
| 2018/0164997 A1 | 6/2018 | Sinha et al. |

OTHER PUBLICATIONS

International Search Report and Written Opinion for the related Application No. PCT/US2021/016483, dated May 20, 2021, 13 pages.

Tarkhanov Ivan: "Policy algebra for access control in enterprise document management systems", 2015 9th International Conference on Application of Information and Communication Technologies (AICT), IEEE, Oct. 14, 2015 (Oct. 14, 2015), pp. 225-228, XP032818324, DOI: 10.1109/ICAICT.2015. 7338551 ISBN: 978-1-4673-6855-1 [retrieved on Nov. 25, 2015].

Deepa et al., "An analysis on Version Control Systems" 2020 International Conference on Emerging Trends in Information Technology and Engineering (ic-ETITE), pp. 1-9. (Year: 2020).

\* cited by examiner

WORKFLOW STYLE GOVERNANCE

CROSS REFERENCE TO RELATED APPLICATIONS

This U.S. patent application is a continuation of, and claims priority under 35 U.S.C. § 120 from, U.S. patent application Ser. No. 16/783,166, filed on Feb. 6, 2020. The disclosure of this prior application is considered part of the disclosure of this application and is hereby incorporated by reference in its entirety.

TECHNICAL FIELD

This disclosure relates to the field of document management and more particularly to document editing.

BACKGROUND

Document management refers to the retrieval and storage of documents in a repository an organized and documented way so that individually stored documents in the repository may be reliably retrieved on demand by different end users without fear of loss of data. Modern document management computer programs incorporate version control in which different versions of a document may be created persisted and retrieved. Version control provides not merely a convenient way for a single end user to track changes from document to document in the lifecycle of the document from initial creation to deletion. But, version control also enables collaborative document editing amongst different end users so that the edits to a document of one end user can be visualized by others in sequence, and also multiple different concurrent edits to a document by different end users can be managed separately.

Traditionally, documents are managed in sequence as part of a linear workflow in which each different version of a document is a separate file loadable into a document editor such as a word processor or text editor. However, not all documents are singular files. Rather, some documents are compositions of components which, when assembled dynamically present as a document. Examples of component driven documents include portal web pages assembled dynamically from different portlet components, or document assemblies assembled from different files each corresponding to a different portion of the document and each editable and persistable separately from other components in the assembly. In the latter instance, a document assembly is edited according to a branched workflow style in which each component has different versions, but any one document may be assembled from any one version of each of the components composited together to form the document.

As can be seen, both a linear workflow style and a branched workflow style may act as a desirable basis upon which a document is to be managed. However, as a practical matter, the conventional document management system only supports one—either linear workflow or branched workflow. Thus, the end user must adapt to two different document management applications to accommodate both a linear workflow style from some documents and a branched workflow style for others.

SUMMARY

Embodiments of the present disclosure address deficiencies of the art in respect to document editing and version control and provide a novel and non-obvious method, system and computer program product for workflow style governance. In an embodiment of the disclosure, a workflow style governance method includes creating a document in memory of a host computing system including one or more computers each with memory and at least one processor and specifying a document style of the document selected from the group consisting of a linear workflow style and a branched workflow style, the linear workflow style permitting a linear sequence of versioning of an entirety of the document, the branched workflow style permitting separate and independent versioning of different fractional portions of the document and the compositing of the different fractional portions to produce a version of the document. The method additionally includes saving the document into fixed storage of the host computing system along with the specified document style.

Thereafter, in response to a subsequent request to load the document into memory of one of the computers, the specified document style for the document may be retrieved and, on condition that the specified document style is a linear workflow style, a specified version of the document is retrieved into a document editor for editing as a new version of the document, but otherwise on condition that the specified document style is a branched workflow style, different components of the document are retrieved as a composition of components, each of an independent version, and a selected one of the components of the composition of the components making up the document is then loaded into a component editor for editing as a new version.

In one aspect of the embodiment, the method additionally includes deferring a re-composition of the document for which a branched workflow has been specified subsequent to having edited a component of the document, but saving the edited component in a pre-commit state in the fixed storage. In another aspect of the embodiment, the method additionally includes permitting editing of the document for which a linear workflow has been specified only if an end user requesting access to the document for editing has access rights to a location in the fixed storage where the document is stored. In yet another aspect of the embodiment, the method additionally includes permitting editing of the selected one of the components of the document for which a branched workflow has been specified only if an end user requesting access to the document for editing has access rights to the selected one of the components irrespective of other access rights of the end user for other components of the document which differ from the access rights to the selected one of the components.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DESCRIPTION OF DRAWINGS

The accompanying drawings, which are incorporated in and constitute part of this disclosure, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein.

Like reference symbols in the various drawings indicate like elements.

DETAILED DESCRIPTION

Embodiments of the disclosure provide for workflow style governance in document management. In accordance with an embodiment of the disclosure, a document is created for editing and a document style specified for the created document. In this regard, the document style may be a linear workflow style or a branched workflow style, in that the linear workflow style permits a linear sequence of versioning of an entirety of the document, while the branched workflow style permits separate and independent versioning of different fractional portions of the document and the compositing of the different fractional portions to produce a version of the document. Then, the document is saved into fixed storage along with the specified document style. Thereafter, in response to a subsequent request to load the document into memory of one of the computers, the specified document style for the document is retrieved and on the condition that the specified document style is a linear workflow style, a specified version of the document is provided to a document editor for editing as a new version of the document, but otherwise on the condition that the specified document style is a branched workflow style, different components of the document are retrieved as a composition of components, each of an independent version, and a selected one of the components is provided to a component editor for editing as a new version. In this way a single document management application is enabled to process different documents according to different workflow styles irrespective of the underlying workflow style of any one document.

Figure 1:
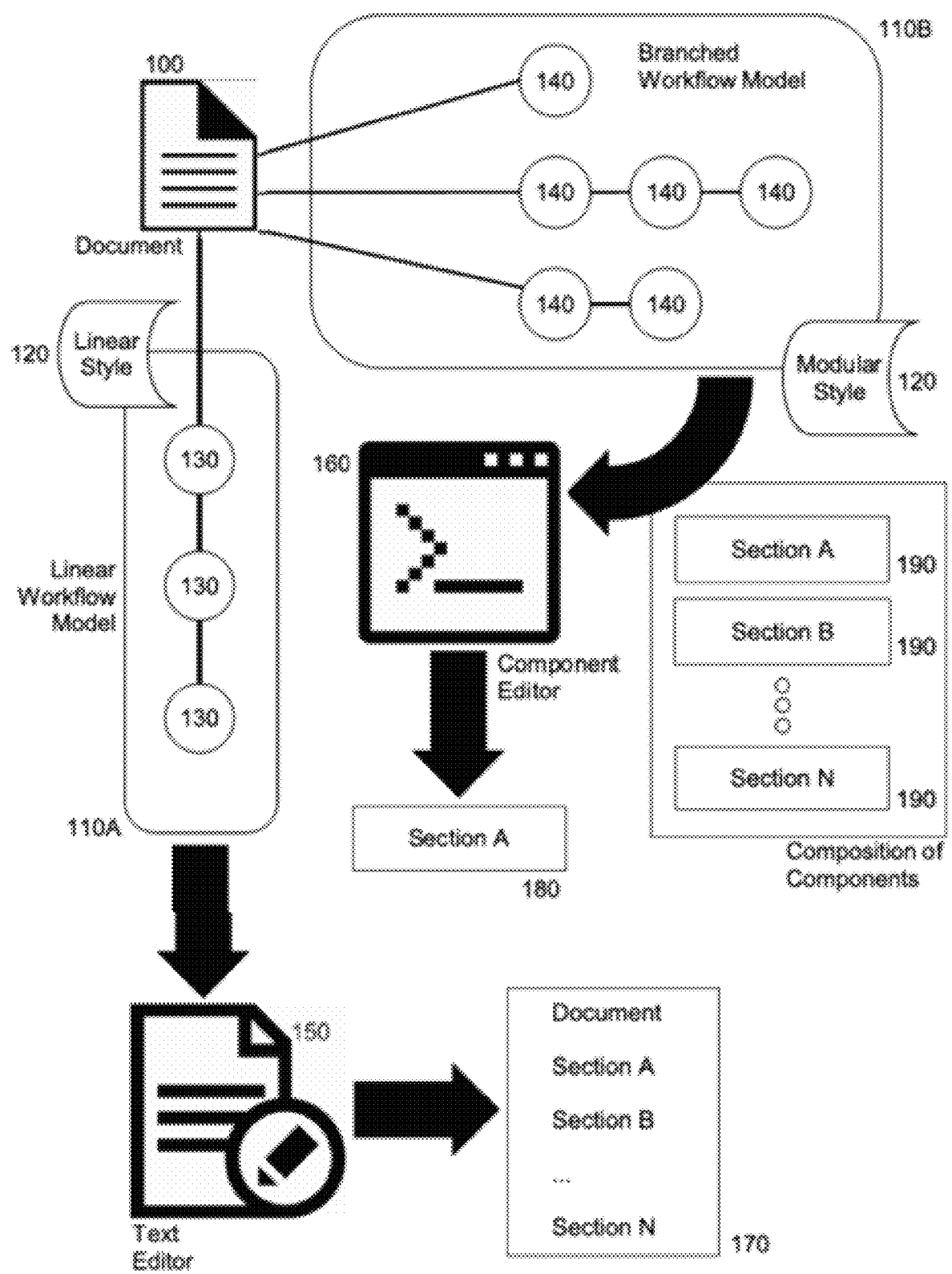
FIG. 1 is pictorial illustration of a process for workflow style governance for document management.

In further illustration, FIG. 1 is pictorial illustration of a process for workflow style governance for document management. As shown in FIG. 1 a document 100 can be persisted as either a singular version amongst a multiplicity of versions 130 of a linear workflow model 110A, or the document 100 can be persisted as a composition of versioned components 140 in a branched workflow model 110B. Along with the persistence of the document 100, a style selection 120 is included so that upon retrieval of the document 100 for editing, a determination is made based upon the recalled style selection 120, whether to provide the document 100 to a text editor 150 in which the entirety of the content 170 of the document 100 may be edited, or whether to provide the document 100 to a component editor 160 in which a selected component 180 from amongst a composition of components 190 may be edited.

Figure 2:
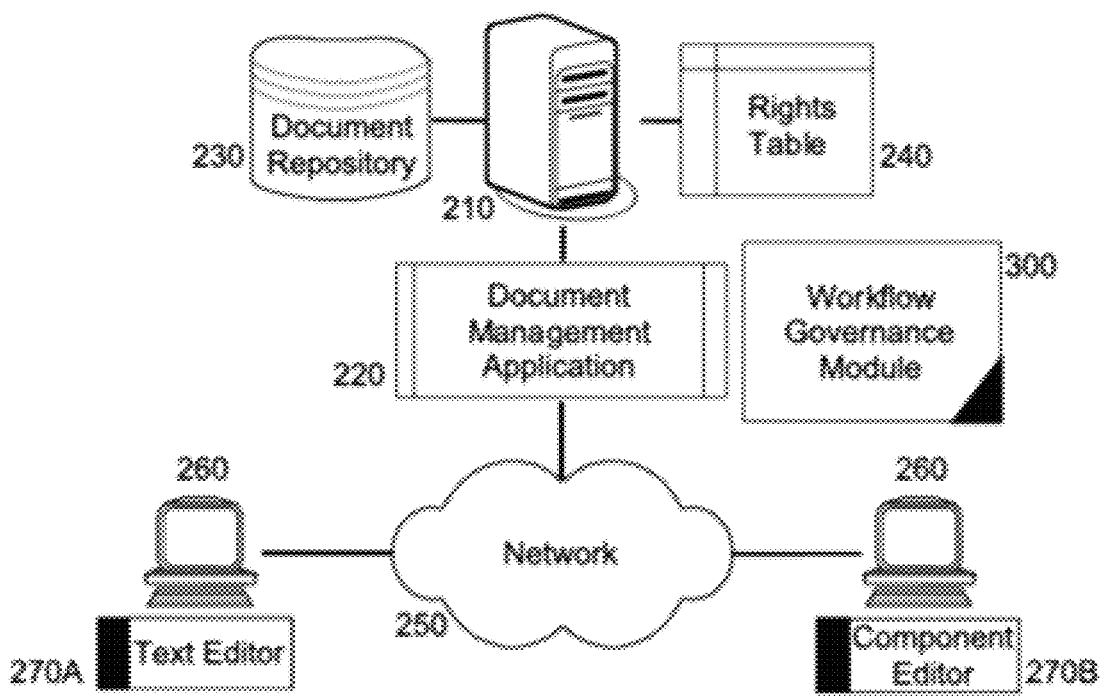
FIG. 2 is a schematic illustration of a document management data processing system adapted for workflow style governance; and, FIG. 3 is a flow chart illustrating a process for workflow style governance in document management.

The process described in connection with FIG. 1 may be implemented in a document management data processing system. In yet further illustration, FIG. 2 schematically shows a document management data processing system adapted for workflow style governance. The system includes a host computing platform 210 that includes one or more computers, each with memory and at least one processor. The host computing platform is coupled to a document repository 230 storing therein, different documents both as a singular file and also as a composition of components to form a virtual file. As well, the host computing platform 210 supports the execution therein of a document management application 220 configured to manage access to the documents in the document repository 230 by requesting computing devices 260 over computer communications network 250, including versioning of the documents when edited in those computing devices 260, and with respect to access rights stored in a rights table 240.

Of note, a workflow governance module 300 is coupled to the document management application 220. The module 300 includes computer program instructions enabled during execution in the host computing platform 210, to assign to each document persisted in the document repository 230, a workflow style selection of either linear or branched. The program instructions additionally are enabled when loading a document from the document repository 230, to identify a correspondingly assigned workflow style selection and to provide the document for editing in a text editor 270A on condition that the workflow style selection is linear, or to provide the document for editing in a component editor 270B on condition that the workflow style selection is branched.

Optionally, in response to a request persist an edited document associated with a linear workflow selection, the request is denied in the event the program instructions determined that an identity of the requestor lacks rights to a location in the document repository 230. As another option, in response to a request persist an edited document associated with a branched workflow selection, the request is denied only if requestor has access rights to the selected one of the components irrespective of other access rights of the requestor for other components of the document which may differ from the access rights to the selected one of the components. As even yet another option, the program instructions may be enabled to defer a re-composition of the document with the selected component, but to save the edited form of the selected component in a pre-commit state in the document repository 230 and to permit re-composition of the document only once a directive is received in the document management application to commit the edits to the selected one of the components.

Figure 3:
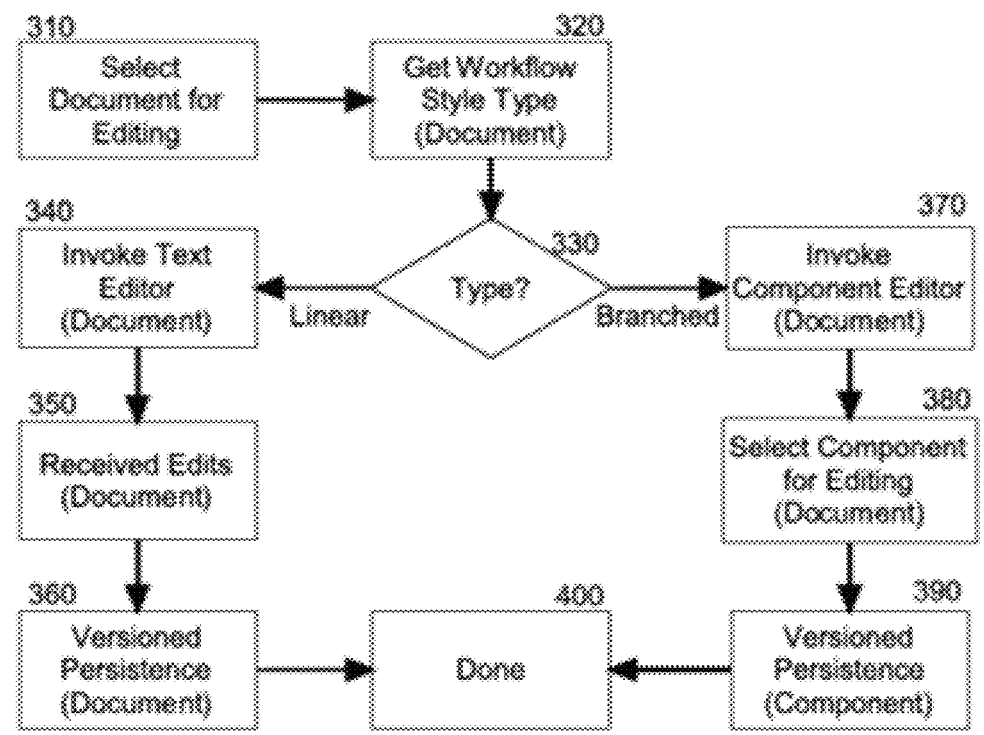

In even yet further illustration of the operation of the workflow governance module 300, FIG. 3 is a flow chart illustrating a process for workflow style governance in document management. Beginning in block 310, a document persisted in the document repository is selected for retrieval for editing. In block 320, a workflow style selection is retrieved in association with the document. In decision block 330, it is determined whether the workflow style selection is linear or branched. If linear, in block 340 a text editor is invoked for editing the document and in block 350, edits to the document are received for persistence in the repository. Thereafter, in block 360 the edited document is subjected to version control and stored in the repository and the process ends in block 400. In contrast, if branched, in block 370 a component editor is invoked for editing the document and in block 380, one of the components in a composition of components forming the document is selected for editing and in block 390, the edited component is subjected to version control and stored in the repository. Finally, the process ends in block 400.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this disclosure, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims as follows:

What is claimed is:

1. A computer-implemented method when executed by data processing hardware causes the data processing hardware to perform operations comprising:
    receiving, from a user device, a request to edit a document stored on memory hardware in communication with the data processing hardware, the memory hardware storing at least one document assigned a branched workflow style and at least one document assigned a linear workflow style, each respective document assigned the branched workflow style comprising a plurality of components and permitting each respective component of the plurality of components to be edited independently as a respective component version, each respective document assigned the linear workflow style permitting an entirety of the respective document to be edited as a respective document version;
    determining that the document is assigned the branched workflow style;
    based on determining that the document is assigned the branched workflow style, retrieving a component of the plurality of components of the document;
    receiving, from the user device, an edit for the component of the plurality of components of the document; and
    based on determining that the user device does not have a permission required to edit the component of the plurality of components of the document, saving the received edit for the component in a pre-commit state at the memory hardware.

2. The computer-implemented method of claim 1, wherein the operations further comprise receiving a second request to edit a second document assigned the linear workflow style.

3. The computer-implemented method of claim 2, wherein the operations further comprise retrieving second document based on the second request.

4. The computer-implemented method of claim 3, wherein retrieving the second document comprises retrieving the second document using a document editor.

5. The computer-implemented method of claim 1, wherein retrieving the component of the plurality of components of the document comprises retrieving the component using a component editor.

6. The computer-implemented method of claim 1, wherein the operations further comprise receiving a directive to commit the received edit for the component.

7. The computer-implemented method of claim 6, wherein the operations further comprise, based on receiving the directive to commit the received edit for the component, saving a respective new component version for the component using the received edit for the component.

8. The computer-implemented method of claim 1, wherein the user device is associated with an end user.

9. The computer-implemented method of claim 1, wherein each respective component of the plurality of components corresponds to a respective portion of the document.

10. The computer-implemented method of claim 1, wherein retrieving the component of the plurality of components of the document comprises retrieving one or more components of the plurality of components of the document.

11. A system comprising:
    data processing hardware; and
    memory hardware in communication with the data processing hardware, the memory hardware storing instructions that when executed on the data processing hardware cause the data processing hardware to perform operations comprising:
    receiving, from a user device, a request to edit a document stored on the memory hardware, the memory hardware storing at least one document assigned a branched workflow style and at least one document assigned a linear workflow style, each respective document assigned the branched workflow style comprising a plurality of components and permitting each respective component of the plurality of components to be edited independently as a respective component version, each respective document assigned the linear workflow style permitting an entirety of the respective document to be edited as a respective document version;
    determining that the document is assigned the branched workflow style;
    based on determining that the document is assigned the branched workflow style, retrieving a component of the plurality of components of the document;
    receiving, from the user device, an edit for the component of the plurality of components of the document; and
    based on determining that the user device does not have a permission required to edit the component of the plurality of components of the document, saving the received edit for the component in a pre-commit state on the memory hardware.

12. The system of claim 11, wherein the operations further comprise receiving a second request to edit a second document assigned the linear workflow style.

13. The system of claim 12, wherein the operations further comprise retrieving the second document based on the second request.

14. The system of claim 13, wherein retrieving the second document comprises retrieving the second document using a document editor.

15. The system of claim 11, wherein retrieving the component of the plurality of components of the document comprises retrieving the component using a component editor.

16. The system of claim 11, wherein the operations further comprise receiving a directive to commit the received edit for the component.

17. The system of claim 16, wherein the operations further comprise, based on receiving the directive to commit the received edit for the component, saving a respective new component version for the component using the received edit for the component.

18. The system of claim 11, wherein the user device is associated with an end user.

19. The system of claim 11, wherein each respective component of the plurality of components corresponds to a respective portion of the document.

20. The system of claim 11, wherein retrieving the component of the plurality of components of the document comprises retrieving one or more components of the plurality of components of the document.

\* \* \* \* \*